United States Patent
Miyayama et al.

(10) Patent No.: US 7,065,678 B2
(45) Date of Patent: *Jun. 20, 2006

(54) MICROCOMPUTER, ELECTRONIC EQUIPMENT, AND DEBUGGING SYSTEM

(75) Inventors: Yoshiyuki Miyayama, Suwa (JP); Makoto Kudo, Fujimi-machi (JP); Yoichi Hijikata, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/985,901

(22) Filed: Nov. 12, 2004

(65) Prior Publication Data

US 2005/0102579 A1    May 12, 2005

Related U.S. Application Data

(60) Continuation of application No. 10/700,621, filed on Nov. 5, 2003, now Pat. No. 6,922,795, which is a division of application No. 09/424,718, filed as application No. PCT/JP99/01654 on Mar. 31, 1999, now Pat. No. 6,665,821.

(30) Foreign Application Priority Data

Mar. 31, 1998    (JP)    ................. 10-103719

(51) Int. Cl.
    *G06F 11/00*    (2006.01)
(52) U.S. Cl. .......................... 714/39; 714/30
(58) Field of Classification Search .................. 714/30, 714/34, 39, 45; 717/128
    See application file for complete search history.

(56) References Cited

U.S. PATENT DOCUMENTS

| | | | |
|---|---|---|---|
| 5,996,092 A | 11/1999 | Augsburg et al. |
| 6,148,437 A | 11/2000 | Shah et al. |
| 6,154,857 A | 11/2000 | Mann |
| 6,243,836 B1 | 6/2001 | Whalen |
| 6,253,338 B1 | 6/2001 | Smolders |
| 6,449,736 B1 | 9/2002 | Matt et al. |
| 6,477,664 B1 | 11/2002 | Hong |

FOREIGN PATENT DOCUMENTS

| | | |
|---|---|---|
| JP | 62-36575 | 8/1987 |
| JP | A-1-114947 | 3/1988 |
| JP | A-63-64136 | 3/1988 |
| JP | A-63-124145 | 5/1988 |
| JP | A-2-61731 | 3/1990 |
| JP | 04-148245 | 5/1992 |
| JP | 04-178840 | 6/1992 |
| JP | 05-28002 | 2/1993 |
| JP | A-5-28002 | 2/1993 |
| JP | 06-75858 | 3/1994 |
| JP | A-9-91177 | 4/1997 |

*Primary Examiner*—Bryce P. Bonzo
(74) *Attorney, Agent, or Firm*—Oliff & Berridge, PLC

(57) ABSTRACT

The present invention provides a microcomputer that makes it possible to implement a real-time trace on a mass-produced chip using few terminals, acquire trace information from within a specified range, and measure execution times, together with electronic equipment and a debugging system comprising this microcomputer.

A trace information output section (16) outputs trace information for implementing a real-time trace, to four dedicated terminals. It outputs instruction execution status information (DST[2:0]) of the CPU to three terminals and the PC value (DPCO) of a branch destination when an PC absolute branch has occurred, serially to one terminal. A microcomputer (10) outputs information indicating the start and end of a trace range or execution-time measurement range to DST[2] in a predetermined sequence. A debugging tool (20) determines the start and end of the trace range or execution-time measurement range from the values in DST[2].

3 Claims, 14 Drawing Sheets

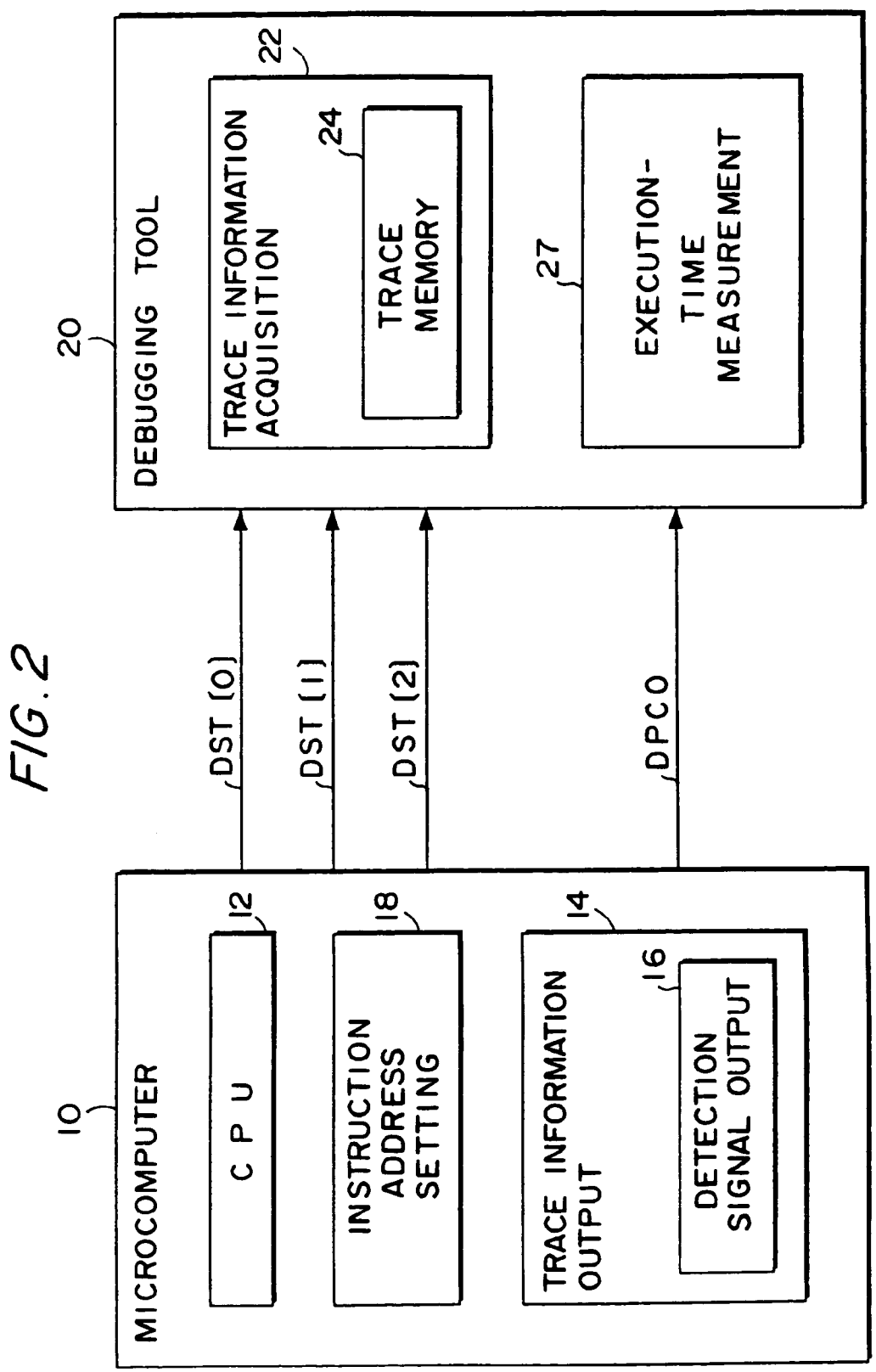

FIG. 3

| DST [2] [1] [0] | | | |
|---|---|---|---|
| 0 | 0 | 0 | CPU INSTRUCTION EXECUTION STATE |
| 0 | 0 | 1 | ORDINARY INSTRUCTION EXECUTION END (EXECUTION END IN ADDRESS SEQUENCE) |
| 0 | 1 | 0 | PC RELATIVE BRANCH INSTRUCTION EXECUTION |
| 0 | 1 | 1 | PC ABSOLUTE BRANCH INSTRUCTION EXECUTION |
| 1 | 0 | 0 | IDLE CYCLE |
| 1 | 0 | 1 | MATCH WITH INSTRUCTION BREAK DURING ORDINARY INSTRUCTION EXECUTION |
| 1 | 1 | 0 | MATCH WITH INSTRUCTION BREAK DURING PC RELATIVE BRANCH INSTRUCTION EXECUTION |
| 1 | 1 | 0 | MATCH WITH INSTRUCTION BREAK DURING PC ABSOLUTE BRANCH INSTRUCTION EXECUTION |
| 1 | 1 | 1 | BREAK SPACE (DEBUGGING MODE) |

310 (rows 1–8), 312 (row 9)

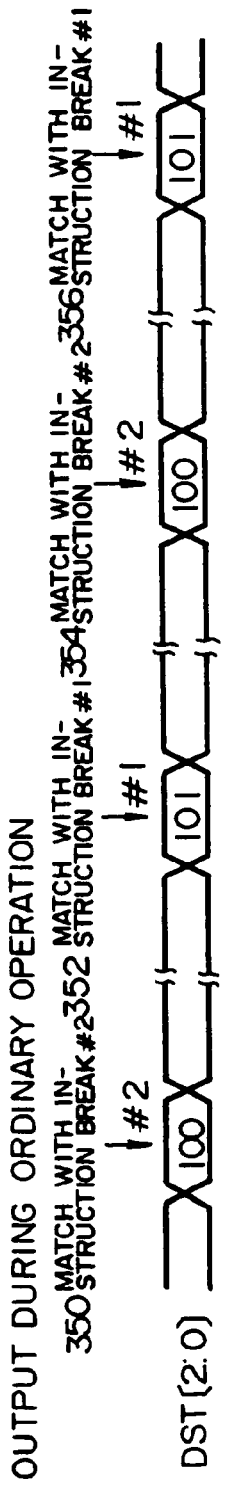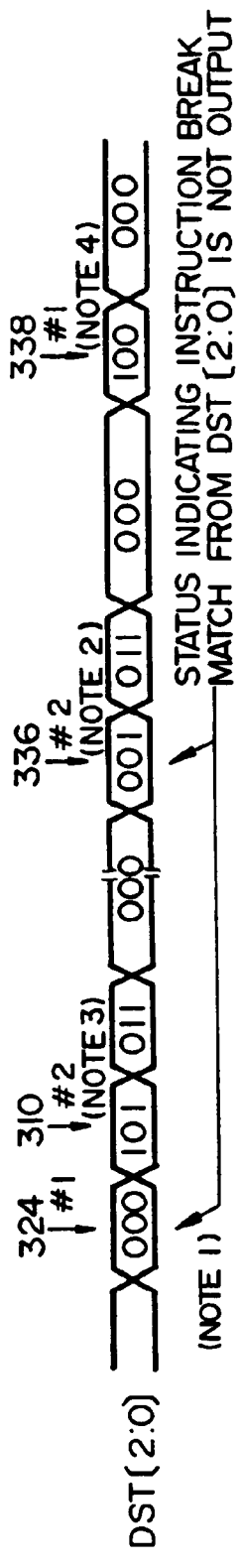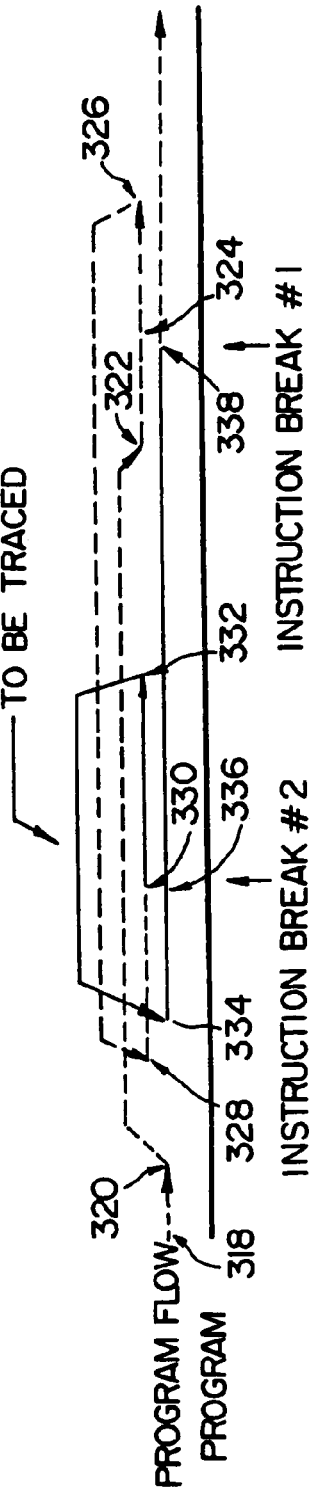

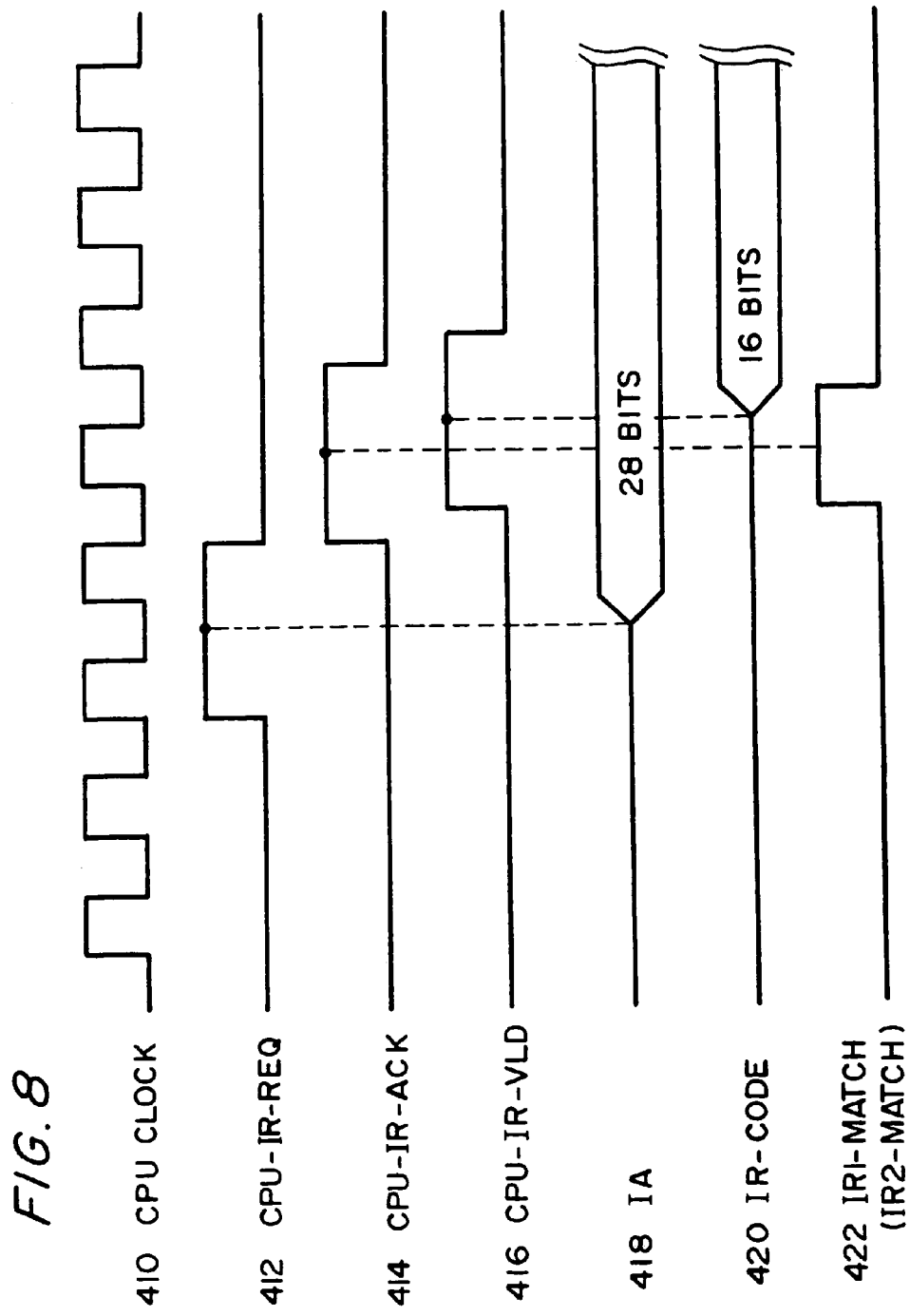

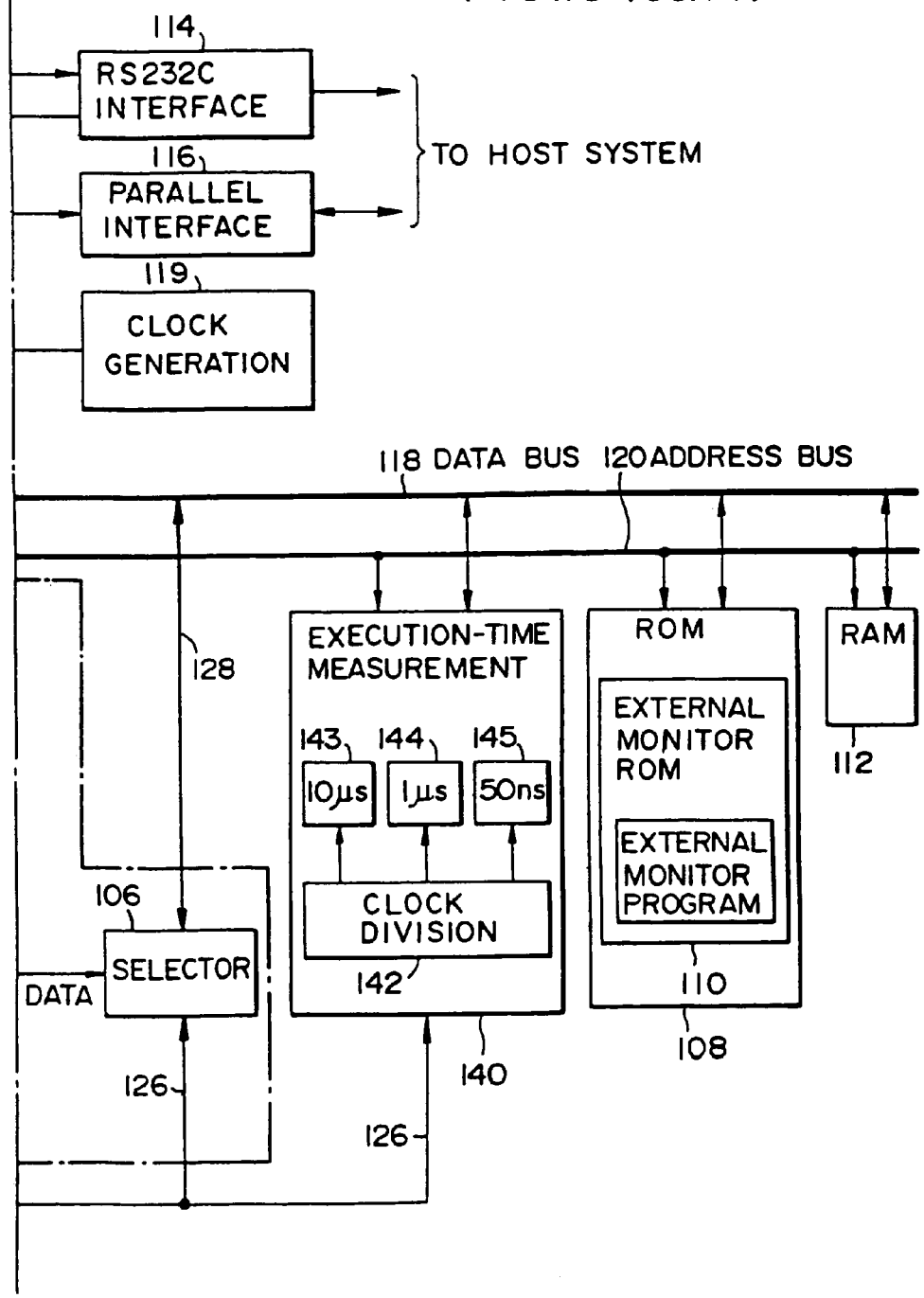
FIG.10 (con't)

MICROCOMPUTER, ELECTRONIC EQUIPMENT, AND DEBUGGING SYSTEM

This is a Continuation of application Ser. No. 10/700,621 filed Nov. 5, 2003 now U.S. Pat. No. 6,922,795 which in turn is a Divisional of application Ser No. 09/924,718 filed Feb. 4, 2000 now U.S. Pat. No. 6,665,821, which in turn is a National Stage of International Application No. PCT/JP99/01654 filed Mar. 31, 1999. The entire disclosure of the prior application is hereby incorporated by reference herein in its entirety.

TECHNICAL FIELD

The present invention relates to a microcomputer and also to electronic equipment and a debugging system comprising the same.

BACKGROUND OF ART

There has recently been increasing demand for the incorporation of microcomputers that are capable of implementing high-level information processing into electronic equipment such as game machines, car navigation systems, printers, and portable information terminals. Such a thus-incorporated microcomputer is usually mounted on a user board called a target system. A software development support tool called an in-circuit emulator (ICE) is widely used for supporting the development of software to be used in the target system.

The CPU-switching type of ICE shown in FIG. 1 is the most common type of this kind of ICE used in the art. With this CPU-switching ICE, a microcomputer 302 is removed from a target system 300 during debugging, and a probe 306 of a debugging tool 304 is connected thereto instead. This debugging tool 304 emulates the operation of the removed microcomputer 302. The debugging tool 304 can also perform various processes necessary for debugging.

However, if the internal operating frequency of the microcomputer 302 of the CPU-switching ICE rises, it becomes difficult to obtain a real-time trace, due to delays in the signals generated by the probe 306 and the buffer that stores trace information.

In addition, if an attempt is made to store trace information in a trace buffer without limitations, the trace buffer would soon overflow so that it may not be possible to acquire trace information for the portions necessary for debugging. In such a case, it would be immensely convenient a trace range can be specified for collecting trace information therein. However, if the internal operating frequency of the CPU were to rise, it would become difficult to implement a trace range specification with external circuitry such as that of a CPU-switching ICE.

Systems are being developed to enable real-time tracing on a mass-produced chip, thus solving the above problems. In such a case, it is necessary to have a dozen or so dedicated terminals for transferring information over the address bus as trace information and storing it in real-time into a trace buffer. These terminals are necessary only during debugging, however, so they are useless as far as the end user is concerned and thus it is preferable to reduce them as far as possible.

In addition, it would also be extremely convenient to have a function that is capable of accurately acquiring trace information within a specified range, even during the implementation of a real-time trace on a mass-produced chip.

DISCLOSURE OF INVENTION

The present invention was devised in the light of the above described technical problems with the objective of providing a microcomputer that makes it possible to implement a real-time trace on a mass-produced chip using few terminals, acquire trace information and measure execution times from within a specified range, together with electronic equipment and a debugging system comprising this microcomputer.

In order to solve the above problems, the present invention relates to a microcomputer having a real-time trace function, the microcomputer comprising a central processing unit for executing an instruction; instruction address setting means for setting an instruction address for detecting an execution of a plurality of instructions to be executed by the central processing unit; and detection signal output means for outputting a detection signal through a single detection signal output terminal, when the execution of the plurality of instructions has been detected.

In this aspect of the invention, it is possible to acquire information indicating that a plurality of instructions have been executed, using a single terminal. It is therefore possible to detect the occurrence of the execution of a plurality of instructions without substantially reducing the number of terminals that can be utilized by the user, which enables an increase in debugging efficiency.

In a further aspect of the present invention, the plurality of instructions comprises a first instruction and a second instruction, and the detection signal output means omits outputting a detection signal when the first instruction is successively executed after the first instruction is executed and a detection signal is output, and outputs a detection signal only when the second instruction is executed.

When a single terminal is used for acquiring execution information on a plurality of instructions, it is difficult to determine from the outside which instructions have been executed.

However, this aspect of the invention ensures that the detection signal is not output when the first and second instructions are executed in a sequence that differs from the expected sequence. Thus the detection signal is always output to the exterior to show that the first and second instructions are executed in the expected sequence.

This aspect of the invention therefore makes it possible to use a single terminal to acquire identifiable information concerning which instructions have been executed, even if a plurality of instructions have been executed in a sequence that differs from the expected sequence.

Another aspect of the present invention further comprises status information output means for outputting status information indicating an execution state of the central processing unit to a status information output terminals, wherein one of the status information output terminals is also used as the detection signal output terminal.

In this case, the status information is information necessary when performing a real-time trace, by way of example.

Since this aspect of the invention ensures that it is not necessary to provide another detection signal output terminal in addition to the status information output terminal, the number of debugging terminals can be further reduced.

In a yet further aspect of the present invention, the status information comprises information for identifying to which of the following states the execution state of the central processing unit belongs: ordinary instruction execution, relative branch instruction execution, absolute branch instruction execution, a match with the instruction address during ordinary instruction execution, a match with the instruction address during relative branch instruction execution, and a match with the instruction address during absolute branch instruction execution.

In this case, a PC relative branch instruction is an instruction to branch at an address that is explicitly written in the program, so it is possible to determine the branch destination from the source code. A PC absolute branch instruction is an instruction to branch at an address that is set by a value in a register during the execution of the program, so it is not possible to determine the branch destination from the source code.

This aspect of the invention enables to represent the execution state and the matching state with the instruction address of the central processing unit and the match state with the instruction address by only 6 types: ordinary instruction execution, relative branch instruction execution, absolute branch instruction execution, a match with the instruction address during ordinary instruction execution, a match with the instruction address during relative branch instruction execution, and a match with the instruction address during absolute branch instruction execution. This makes it possible to reduce the number of debugging terminals provided for the microcomputer to only three terminals.

In a still further aspect of the present invention, an instruction address that is set by the instruction address setting means comprises an address for specifying at least one of start and end of a trace range.

With this aspect of the invention, information for detecting the start or end of a trace range can be output from a single terminal. This makes it possible to provide a microcomputer that can implement a real-time trace on a mass-produced chip and acquire trace information from within a specified range, using only a few terminals.

In an even further aspect of the present invention, an instruction address that is set by the instruction address setting means comprises an address for specifying at least one of a start and end of a execution-time measurement range of a program.

This aspect of the invention makes it possible to output information for detecting the start and end of an execution-time measurement range, from a single terminal. This makes it possible to provide a microcomputer that can acquire information for determining the timing of the start and stop of execution-time measurement within a specified range, using only a few terminals.

In yet another aspect of the present invention, the instruction address setting means comprises a plurality of registers for holding instruction address information for detecting the execution of a plurality of instructions, and the detection signal output means comprises: means for holding a comparison result between an instruction address that was read out previously for instruction execution by the central processing unit and an address that has been held in each of the registers, until the instruction at the previously read-out instruction address is executed, and outputting a detection signal based on the held comparison result when the instruction at the previously read-out instruction address has been executed; and means for invalidating the comparison result with instructions that were read out before the branch instruction was executed when the executed instruction was a branch instruction.

In this case, the invalidation of the comparison result includes both initializing the storage area and resetting write and read pointers.

The present invention bases the detection of the execution of a plurality of instructions on previously read-out instructions, with the output of a detection signal indicating actual execution. This configuration enables optimal detection, even with a microcomputer that performs pipeline processing.

In still another aspect of the present invention, the registers comprise at least two registers for holding a start address and an end address for defining a given range of a program, and the detection signal output means comprises: first comparison means and second comparison means for comparing an instruction address, that was read out previously for instruction execution by the central processing unit, with the start address and the end address; a comparison result holding section that is capable of holding a plurality of comparison results from the first comparison means and the second comparison means; means for reading the comparison results held in the comparison result holding section, at a timing that the previously-read instruction has been executed; means for resetting any the comparison results held in the comparison result holding section when an executed instruction was a branch instruction; and a logic circuit for outputting a detection signal based on the comparison results that have been read from the comparison result holding section, when addresses that are held in the first register and the second register have been executed in a predetermined sequence.

During pipeline processing, there is a time lag between instruction acquisition and execution, making it difficult to acquire execution address information from the signal lines. This aspect of the invention makes it possible to acquire the comparison result obtained at the stage at which an instruction was previously read out for instruction execution, at the execution stage. This enables signal processing that can cope with pipeline processing.

Note that when a branch instruction has been executed, and even if the previously read-out instruction is not executed because of the generation of the branch instruction, the accurate determination is possible by resetting comparison results, which were held in the comparison result holding section, with previously read-out instruction before the branch instruction occurred.

Electronic equipment relating to another aspect of the present invention comprises any one of the above described microcomputers; an input source of data that is to be processed by the microcomputer; and an output device for outputting data that has been processed by the microcomputer.

This enables a shortening of the development period and a reduction in the cost of electronic equipment, due to more efficient debugging of programs running on that electronic equipment.

A further aspect of the present invention relates to a debugging system for a target system that comprises a microcomputer, wherein the microcomputer comprises: a central processing unit for executing an instruction; instruction address setting means for setting an instruction address for detecting an execution of a plurality of instructions to be executed by the central processing unit; and detection signal output means for outputting a detection signal through a single detection signal output terminal when the execution of the plurality of instructions has been detected, and the debugging system further comprises trace information acquisition means for receiving the detection signal from the microcomputer, and acquiring trace information by controlling a start and end of the acquisition of trace information based on the detection signal.

This aspect of the invention makes it possible to provide a debugging system that is capable of acquiring debugging information within a specified range, with only a few terminals.

A still further aspect of the present invention relates to a debugging system for a target system that comprises a microcomputer, wherein the microcomputer comprises: a central processing unit for executing an instruction; instruction address setting means for setting an instruction address for detecting an execution of a plurality of instructions to be executed by the central processing unit; and detection signal output means for outputting a detection signal through a single detection signal output terminal when the execution of the plurality of instructions has been detected, and the debugging system further comprises execution-time measurement means for receiving the detection signal from the microcomputer, and measuring execution time by controlling a start and end of measurement of program execution time based on the detection signal.

This aspect of the invention makes it possible to provide a debugging system that is capable of acquiring execution times within a specified range, with only a few terminals.

In a debugging system in accordance with an even further aspect of the present invention, the plurality of instructions comprises a first instruction and a second instruction, and the detection signal output means omits outputting a detection signal when the first instruction is successively executed after the first instruction is executed and a detection signal is output, and outputs a detection signal only when the second instruction is executed.

This aspect of the invention makes it possible to provide a debugging system that can identify which instructions of debugging have been executed, even if a plurality of instructions are executed in a sequence that differs from the expected sequence, using a single terminal.

BRIEF DESCRIPTION OF DRAWINGS

FIG. 2 is illustrative of the features of an embodiment of the present invention;

FIG. 3 shows the relationship between the output value of DST[2:0] and the CPU instruction execution state;

FIGS. 4A, 4B, and 4C are illustrative of DST[2:0] outputs when there is matching with an instruction break in this embodiment;

FIG. 8 is an abbreviated timing chart of signals between the CPU and BCU;

BEST MODE FOR CARRYING OUT THE INVENTION

Figure 1:
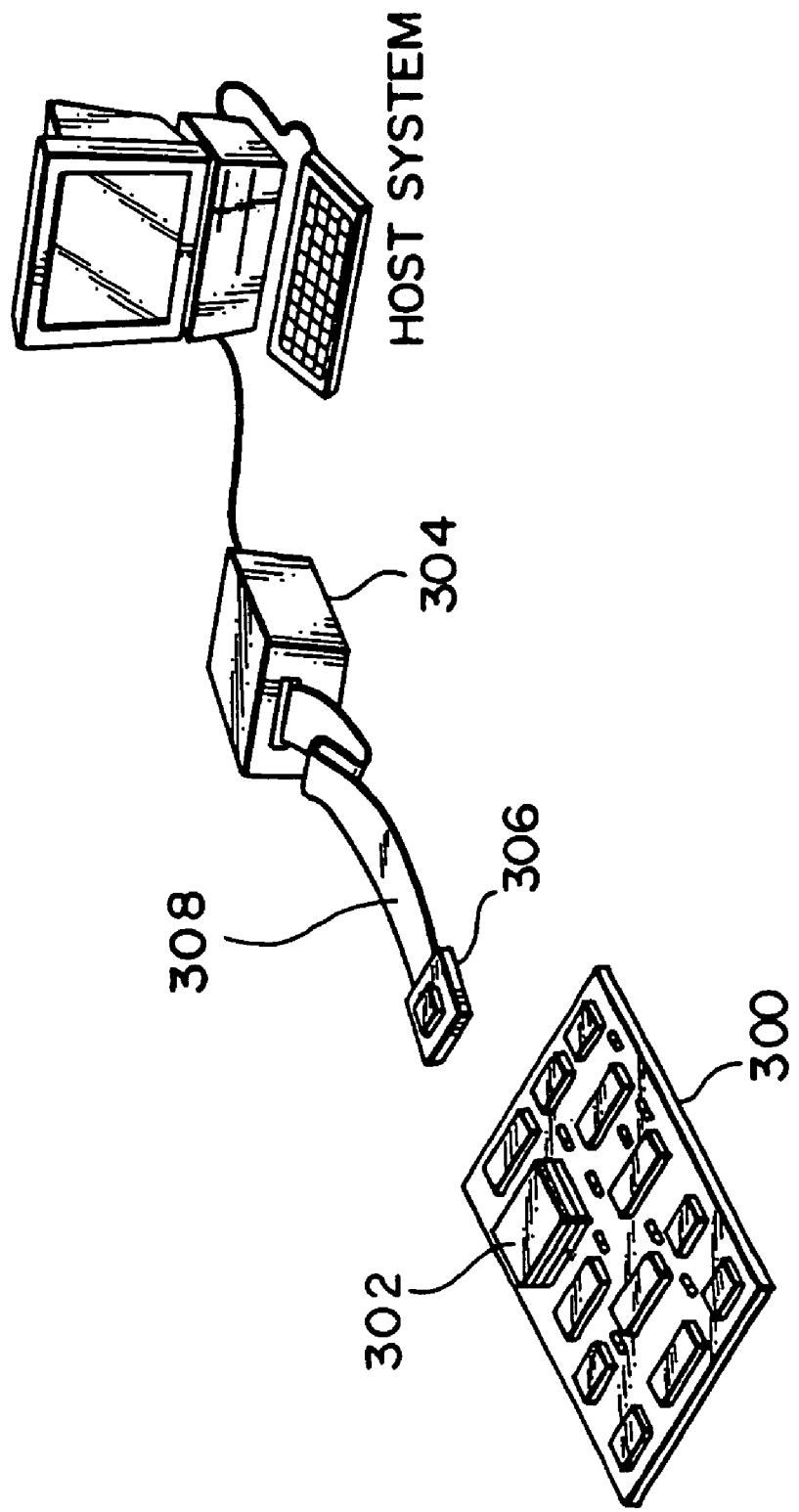
FIG. 1 shows an example of a CPU-switching ICE.

Preferred embodiments of the present invention are described below with reference to the accompanying drawings.

1. Characteristics of the Present Embodiment

The description first concerns the configuration of an embodiment of the present invention, referring to FIG. 2.

As shown in FIG. 2, a microcomputer 10 of this embodiment comprises a central processing unit (CPU) 12, an instruction address setting section 18, and a trace information output section 14. The trace information output section 14 comprises a detection signal output section 16.

An external debugging tool 20 of this microcomputer 10 comprises a trace information acquisition section 22 and a execution-time measurement section 27.

In this case, the trace information output section 14 outputs trace information for implementing a real-time trace, to four dedicated terminals. More specifically, it outputs instruction execution status information (DST[2:0]) of the CPU to three terminals at each clock signal, to function as a status information output means. In addition, if PC absolute branch execution occurs, it outputs the PC value (DPCO) of the branch destination serially from the single terminal during the subsequent 27 clock cycles.

The relationship between the output value of DST [2:0] and the CPU instruction execution state is shown in FIG. 3. In this case, a PC relative branch instruction is an instruction to branch at an address that is explicitly written in the program, so it is possible to ascertain the branch destination from the source code. A PC absolute branch instruction is an instruction to branch at an address that is set by a value in a register during the execution of the program, so it is not possible to ascertain the branch destination from the source code. This embodiment of the invention therefore enables a trace by outputting the PC value (DPCO) of the branch destination when an PC absolute branch instruction occurs.

In other words, when a microprocessor is executing instructions in address sequence (when the output value of DST[2:0] is 000 or 100), it is possible to ascertain how far the program counter has proceeded from a trace of the source code of the program. In addition, if the microprocessor has executed a PC relative branch instruction (if the output value of DST[2:0] is 001 or 101), trace is still possible since the branch destination can be ascertained from the source code of the program.

However, if the microcomputer has executed a PC absolute branch instruction (if the output value of DST[2:0] is 010 or 110), it is not possible to do a trace from DST[2:0] alone, because the branch destination cannot be ascertained from the source code of the program. In that case, a trace can be enabled by also outputting the PC value (DPCO) of the branch destination.

The description now concerns the way in which the trace range can be specified by using a single terminal, which is a feature of this embodiment of the invention. If ordinary range specification is not performed, the configuration is such that trace information (DST[2:0] and DPCO) is written sequentially to a trace memory 24 until the memory fills, whereupon old information is erased and new information is overwritten. It often happens, however, that the trace memory soon overflows and thus it is not possible for the user to acquire trace information for the necessary portions. This embodiment of the invention has a configuration such that it is possible to detect the start and end positions of the acquisition of a trace range, from the values of DST[2:0].

The configuration by which the start and end positions for the acquisition of a trace range are detected from the values of DST[2:0] is described below.

In FIG. 3, 312 denotes a break space, in other words, that the DST output in debugging mode is 111. Since user programs are not executed when in debugging mode, there are three options in which DST[2] is 1, as shown at 310. In other words, these are states in which the instruction break matches one of an ordinary instruction, a PC relative instruction, or a PC absolute instruction. An instruction break in this case means an instruction address that is set by an instruction address setting means. A start address and end address for specifying a trace range within a program can be set as instruction breaks by the instruction address setting means. Thus, if the value of DST[2] that is output from the microcomputer is 1, the debugging tool 20 can detect that the microcomputer 10 has executed the instruction at the start address or end address.

Note that when an instruction break actually occurs in this embodiment, there is no break and the execution continues, but this function can also be used together with a break function in a chip in which breaks actually occur.

The description now turns to identifying whether the instruction at the start address has been executed or the instruction at the end address has been executed, when DST[2] is 1.

Diagrams that are illustrative of the output of DST[2:0] at the matching with an instruction break in accordance with this embodiment are shown in FIGS. 4A, 4B, and 4C.

A match with instruction break #2 indicates when the instruction at the start address has been executed and a match with instruction break #1 indicates when the instruction at the end address has been executed. In other words, from instruction break #2 to instruction break #1 becomes the range during which trace information is acquired.

When instruction break #2 and instruction break #1 are repeated in sequence as shown at 350, 352, 354, and 356 in FIG. 4A, the processing can be repeated such that the acquisition of trace information starts at each match with instruction break #2 and the acquisition of trace information ends at each match with instruction break #1.

However, it could happen that instruction break #2 and instruction break #1 do not match in the predetermined sequence, such as at a branch in the program, for example. In such a case, instruction break #2 first matches and then the status indicating that match is output (hereinafter, this is called "match status". Note that in this embodiment DST [2]=1), then the match status is output at the point at which the next instruction break #1 matches. During this time, the match status for instruction break #2 is not output, even if a match occurs. Furthermore, the following operation could be repeated: when an instruction break #2 is matched, the match status is output, then when the next instruction break #1 is matched, the match status is output.

FIGS. 4B and 4C are illustrative of examples in which the matches with the instruction break #1 and instruction break #2 are irregular. In FIG. 4C, a program that has executed ordinary instructions sequentially from 318 to 320 branches at 320 to 320, in accordance with a branch instruction. The execution progress from 322 to 326 has match with instruction break #1 (at 324), but the match status from DST[2:0] is not output, as shown at (Note 1) in FIG. 4B. This is because the first match status is output only when the instruction break #2 matches.

The program that has branched from 326 to 328 has a match at instruction break #2 (330) and the status indicating this match is output from DST[2:0], as shown at (Note 3) in FIG. 4B.

Figure 5:
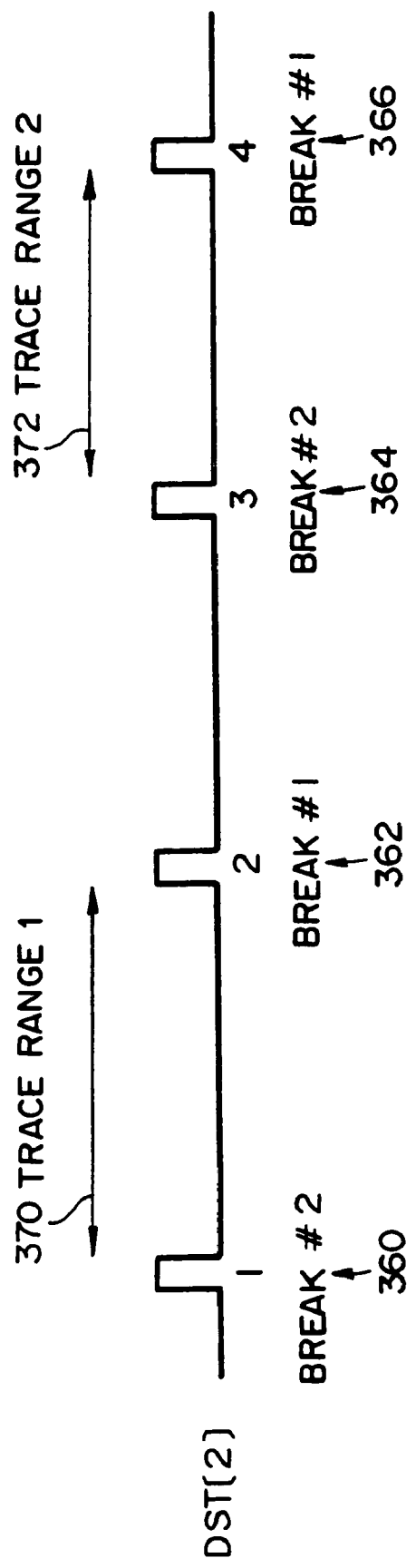
FIG. 5 shows the relationship between DST[2] and trace range.

The program that has branched from 332 to 334 has matches at instruction break #2 and instruction break #1 (336 and 338) in the progress of sequential execution from 334. However, since the configuration is such that the second match status is output when the instruction break #1 match occurs, no match status is output at 336 in FIG. 4B (Note 2), but the match status is output at 338 (Note 4). Therefore, the range indicated by solid lines between 330 and 338 becomes the trace range (see FIG. 4C) The relationship between DST[2] and trace range is shown in FIG. 5. As shown in this figure, there is an instruction break #2 match state when there is a match status output at the odd-numbered position of DST[2] (360 and 364) and there is an instruction break #1 match state when there is a match status output at the even-numbered position of DST[2] (362 and 366). Therefore, the trace information acquisition section 22 of the debugging tool 20 stores trace information for trace range 1 (370) in the trace memory 24 from 360 to 362, then stores trace information for trace range 2 (372) in the trace memory 24 from 364 to 366.

If the relationship between the pulse sequence and the start and end of the trace range is set in this manner, the debugging tool can determine the starting and stopping of the trace from whether it is a pulse at the odd-numbered position or a pulse at the even-numbered position. It is therefore possible to specify a trace range by using only one terminal.

This trace range specification function can also be used for specifying an execution-time measurement range for measuring an execution time. In other words, in a similar manner to a trace range, it is possible to set a start address and an end address of a range for measuring an execution time as instruction breaks, so that the execution-time measurement section 27 of the debugging tool 20 can measure the execution time within a desired range.

In this manner, it is possible to implement a real-time trace on a mass-produced chip, using only a few terminals, to acquire trace information within a specified range and measure execution times.

Note that execution time measurement can be performed independently of a trace. In other words, it is possible to measure execution times alone, without acquiring trace information.

2. Detailed Structural Example

Figure 6:
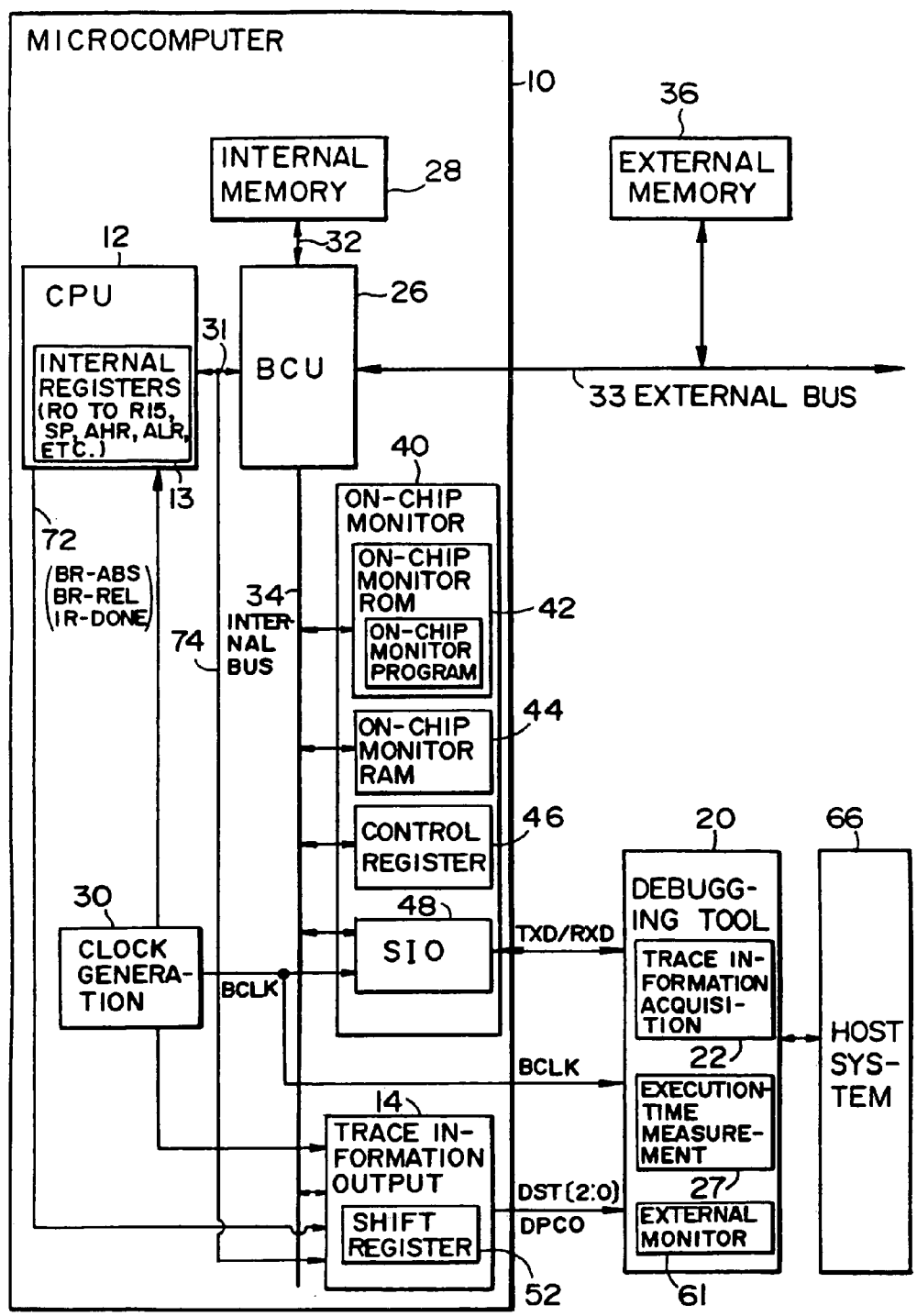
FIG. 6 is a functional block diagram of an example of the configuration of the microcomputer and debugging system of this embodiment.

A detailed example of the structure of the microcomputer and debugging system of this embodiment is shown in FIG. 6. As shown in FIG. 6, the microcomputer 10 comprises a CPU 12, a bus control unit (BCU) 26, an internal memory 28, a clock generation section 30, an on-chip monitor section 40, and the trace information output section 14.

In this case, the CPU 12 executes various instructions and comprises internal registers 13. The internal registers 13 comprise general-purpose registers R0 to R15 as well as a stack pointer (SP) register, a higher arithmetic register (AHR) for storing sum-of-products result data, and a lower arithmetic register (ALR) for storing sum-of-products result data, which are special registers.

The BCU 26 controls buses. It controls a bus 31 of a Harvard architecture connected to the CPU 12, a bus 32 connected to the internal memory 28, an external bus 33 connected to the external memory 36, and an internal bus 34 connected to components such as the trace information output section 14, by way of example.

The clock generation section 30 generates the various clock signals used within the microcomputer 10. The clock generation section 30 also supplies a clock signal to an external debugging tool 20 via the BCLK.

The on-chip monitor section 40 comprises an on-chip monitor ROM 42, an on-chip monitor RAM 44, a control register 46, and an SIO 48.

In this case, an on-chip monitor program is stored in the on-chip monitor ROM 42. The on-chip monitor program of the present embodiment executes only simple primitive commands such as GO, read, and write. This means that the memory capacity of the on-chip monitor ROM 42 can be restrained to approximately 256 bytes, by way of example, and thus the microcomputer 10 can be made more compact while still retaining an on-chip debugging function.

The contents of the internal registers 13 of the CPU 12 are saved to the on-chip monitor RAM 44 at a transition to debugging mode. This ensures that the execution of the user program can restart correctly after debugging mode ends. Reading and other manipulation of the contents of these internal registers 13 can be implemented by primitive commands within the on-chip monitor program, such as a read command.

The control register 46 is a register for controlling the various debugging processes, and it contains various enabling bits and an instruction break address register. The CPU 12 operating in accordance with the on-chip monitor program can implement the various debugging processes by writing data to the bits of the control register 46 and reading data from those bits. Note that a start address or an end address for specifying a trace range or an execution-time measurement range is set in this instruction break address register.

The SIO 48 sends and receives data to and from the debugging tool 20 that is provided outside the microcomputer 10. The SIO 48 and the debugging tool 20 are connected by a TXD/RXD line (data transfer line).

The trace information output section 14 and the debugging tool 20 are connected by four lines for outputting DST[2:0] and DPCO.

The trace information output section 14 implements a real-time trace function, and it outputs to the exterior via four dedicated terminals the value in the program counter (PC) for the branch destination when the CPU instruction execution status information (DST[2:0]) shown in FIG. 3 is output and a PC absolute branch has occurred.

The configuration which outputs DST[2:0] and DPCO is described below.

The CPU 12 outputs signals representing the CPU execution state (BR-ABS, BR-REL, and IR-DONE) to a line 72. BR-ABS is output when the CPU has executed a PC absolute branch instruction, BR-REL is output when the CPU has executed a PC relative branch instruction, and IR-DONE is output when the CPU has executed an ordinary instruction.

When the trace information output section 14 receives a signal indicating the execution state of the CPU from the line 72, it outputs a status corresponding to DST[1:0], based on that signal. In other words, when the IR-DONE signal has been accepted, the CPU has just executed an ordinary instruction so DST[1:0]=00 is output. When the BR-REL signal has been accepted, the CPU has just executed a relative branch instruction so DST[1:0]=01 is output. When the BR-ABS signal has been accepted, the CPU has just executed a PC absolute branch instruction so DST[1:0]=10 is output. The configuration that outputs DST[2] will be described later. In this manner, the trace information output section 14 functions as a status information output means.

In addition, the trace information output section 14 takes in an instruction address (the program counter value for the jump destination) in an internal shift register 52 at a predetermined timing over a line 74, based on the execution of a PC absolute branch instruction (BR-ABS signal), and outputs the value in the shift register 52 serially as DPCO in synchronization with BCLK.

The debugging tool 20 comprises an external monitor section 61, the trace information acquisition section 22, and the execution-time measurement section 27, and is connected to a host system 66 implemented by a personal computer or the like.

The trace information acquisition section 22 stores the 3-bit DST[2:0] and the DPCO indicating the value in the program counter (PC) for the branch destination in an internal trace memory. If a trace range has been specified, the DST[2:0] and DPCO for that range is stored in the trace memory.

The execution-time measurement section 27 measures the time it takes to execute the specified range.

The external monitor section 61 performs processing to convert (parse) debugging commands that have been input from the host system 66, into primitive commands. The external monitor section 61 also sends data indicating the execution of primitive commands to the on-chip monitor section 40, and the on-chip monitor section 40 performs the processing for executing the indicated primitive commands.

If it is desired to specify a trace range or an execution-time measurement range, therefore, the user inputs a command for setting a break address from the host system. This break address setting command is converted into a write command to that instruction break address register. The on-chip monitor program ensures that the start address and end address of the trace range or execution-time measurement range are set into the instruction break address register by executing this primitive write command. In other words, the on-chip monitor program and instruction break address register function as an instruction address setting means.

3. Configuration for DST[2] Output

Figure 7:
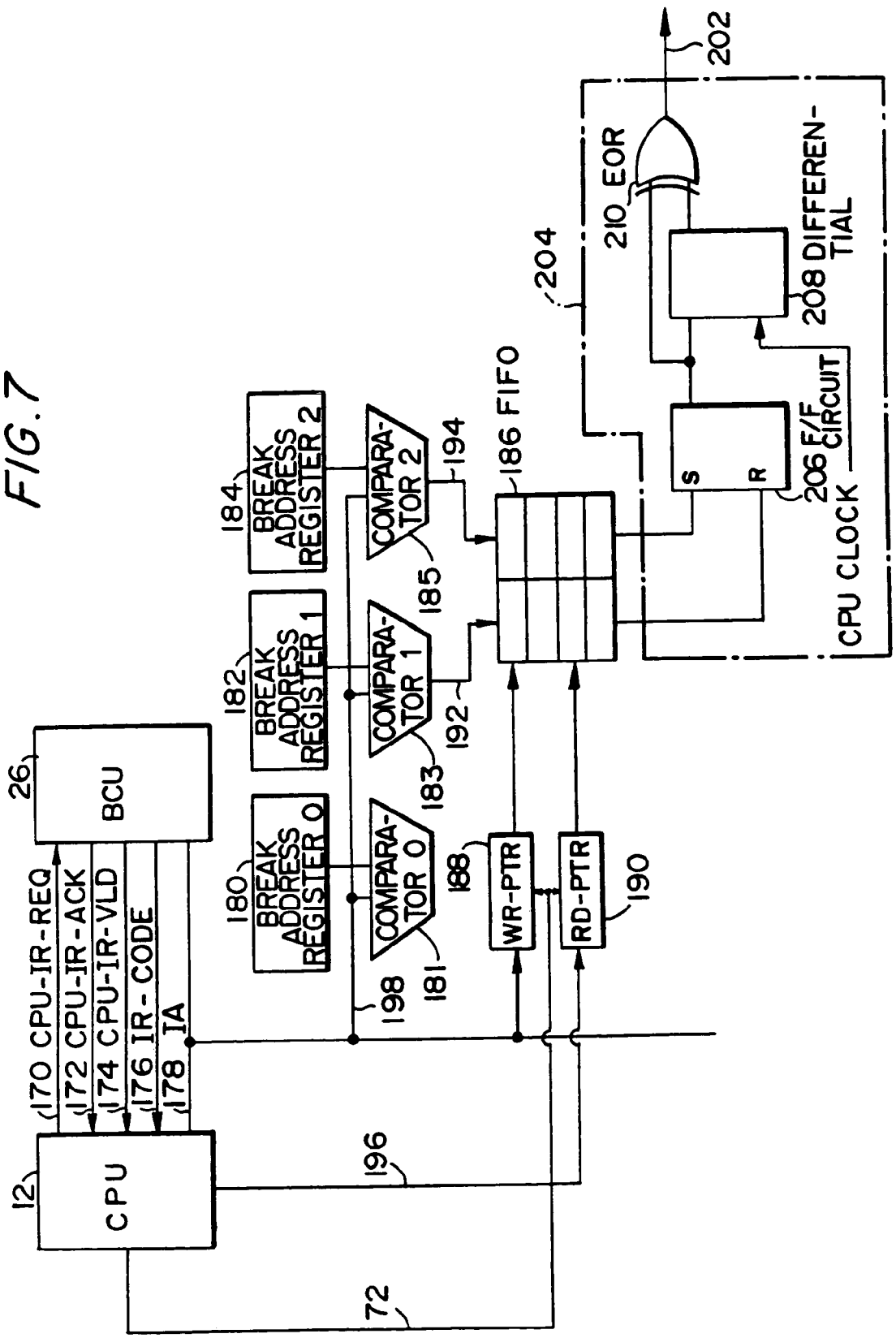
FIG. 7 shows an example of the hardware configuration for outputting DST[2]

An example of the hardware configuration for outputting DST[2] is shown in FIG. 7.

The CPU and BCU are connected to lines 170, 172, 174, 176, and 178, which they use for signal handshake.

A schematic timing chart of these signals is shown in FIG. 8. Reference number 410 denotes a CPU clock.

The CPU 12 sends a pre-fetch request signal (CPU_IR_REQ) to the BCU 26 through the line 170 (412 in FIG. 8) and sends the instruction address (IA) to be fetched to the BCU 26 through the line 178 (418 in FIG. 8). On receiving the CPU_IR_REQ signal 412, the BCU 26 sends a signal indicating that that signal has been received (CPU_IR_ACK) through the line 172 to the CPU 12 (414 in FIG. 8). It also sends the instruction code (IR_CODE) that has been read from that instruction address (IA) through the line 176 to the CPU (420 in FIG. 8) and sends a signal indicating that the instruction code has been sent (CPU_IR_VLD) through the line 174 to the CPU (416 in FIG. 8).

A break address register 0 (180), a break address register 1 (182), and a break address register 2 (184) are registers for holding the start address and end address of the trace range or execution-time measurement range. In this embodiment, the on-chip monitor program sets the end address in break address register 2 and the start address in break address register 1.

A comparator 0 (181), a comparator 1 (183), and a comparator 2 (185) compare the instruction address (IA) that comes in over a line 198 with the addresses held in-break address register 0, break address register 1, and break address register 2, respectively.

The comparison results of comparator 1 and comparator 2 are input to a four-stage (8_bit) FIFO 186. The comparison result is written in the FIFO 186 based on a write pointer WR_PTR 188, and the comparison result is read therefrom and output to a later-stage detection signal control circuit 204, based on a read pointer RD_PTR 190.

The detection signal control circuit 204 comprises a flip-flop circuit 206, a differential circuit 208, and an EOR circuit 210. This circuit configuration makes it possible to provide control such that, after a comparison result indicating a match with break address register 2 is received and a detection signal 202 (DST[2]=1) has been output, the detection signal 202 (DST[2]=1) is output only when there is a match with break address register 1, without outputting the detection signal 202 (DST[2]=1).

The description now turns to the timing at which comparison results are written to and read from the FIFO 186. More specifically, the write pointer WR_PTR 188 is incremented when the BCU has accepted an instruction fetch request (at the timing at which the CPU_IR_ACK signal is output), and the comparison result is written to the position indicated by the write pointer WR_PTR 188 at the same timing as the incrementation.

This is because this embodiment has a configuration such that the timing at which the CPU_IR_ACK signal is output is synchronized with the timing of a signal IR1_MATCH 192 (or IR2_MATCH 194), indicating the comparison result from comparator 1 (or comparator 2) (422 in FIG. 8). The fact that the CPU_IR_ACK signal has been output verifies that the BCU has accepted the pre-fetch request, and thus it definitely cannot be executed while no branch instruction has been executed.

The read pointer RD_PTR is incremented at the timing at which a signal indicating that the CPU 12 has executed an instruction is output from a line 196, and the comparison result is read from the position indicated by read pointer RD_PTR at the same timing as the incrementation.

This reading and writing at the above described timing is to ensure conformity with pipeline processing. In other words, the state is such that an instruction has been pre-fetched at the stage at which a write to the FIFO 186 occurs, and the instruction actually ends when the CPU 12 outputs the DAN signal.

If the CPU 12 executes a branch instruction in this case, any instruction that has been pre-fetched before the branch instruction is not executed. This makes it necessary to reset the comparison results relating to the instruction that was pre-fetched before the branch instruction. The WR_PTR 188 and RD_PTR 190 are therefore reset by a sign al through the line 72 from the CPU 12 indicating that an PC absolute branch instruction has been executed (BR-ABS, described with reference to FIG. 6).

Figure 9A:
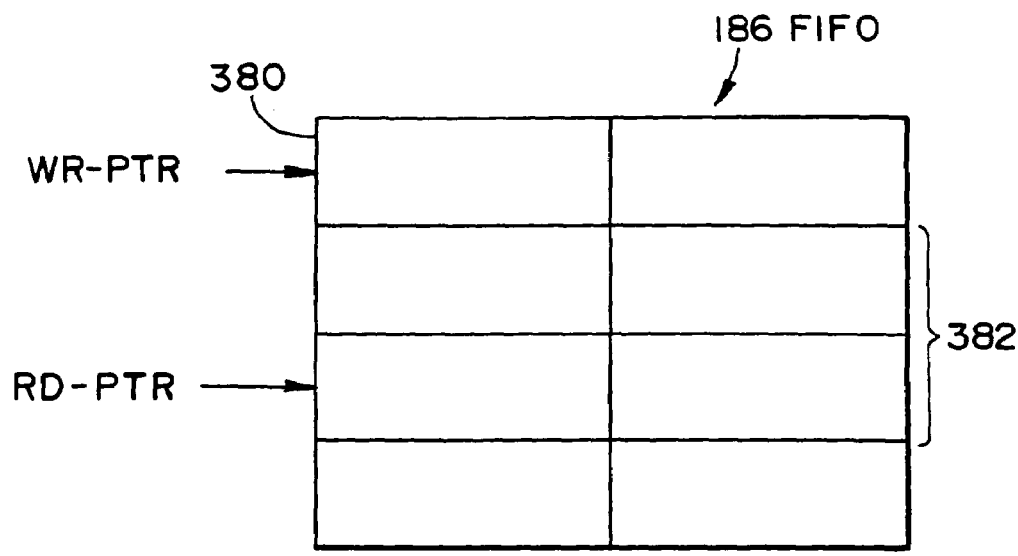
FIGS. 9A and 9B are illustrative of the relationship between a branch instruction and FIFO reset.
Figure 9B:
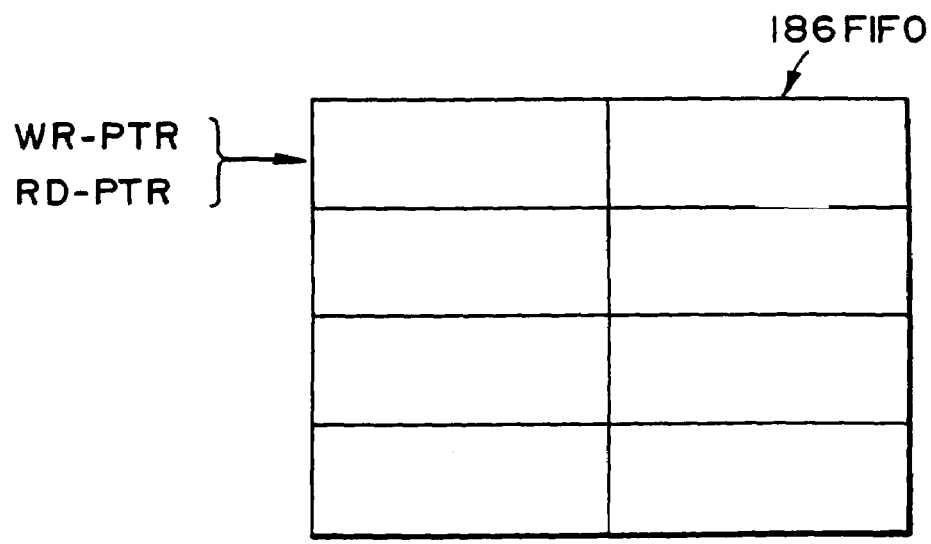

Illustrations of the relationship between a branch instruction and a reset are shown in FIGS. 9A and 9B. FIG. 9A shows the FIFO state before a branch instruction is executed and FIG. 9B shows the FIFO state after a reset. If there is a write pointer at 380, a branch instruction has been executed.

If that occurs, comparison results 382 with the pre-fetched instruction will become comparison results for a non-executed instruction.

The write pointer WR_PTR and read pointer RD_PTR are therefore reset to their initial values.

4. Example of Debugging Tool Configuration

Figure 10:
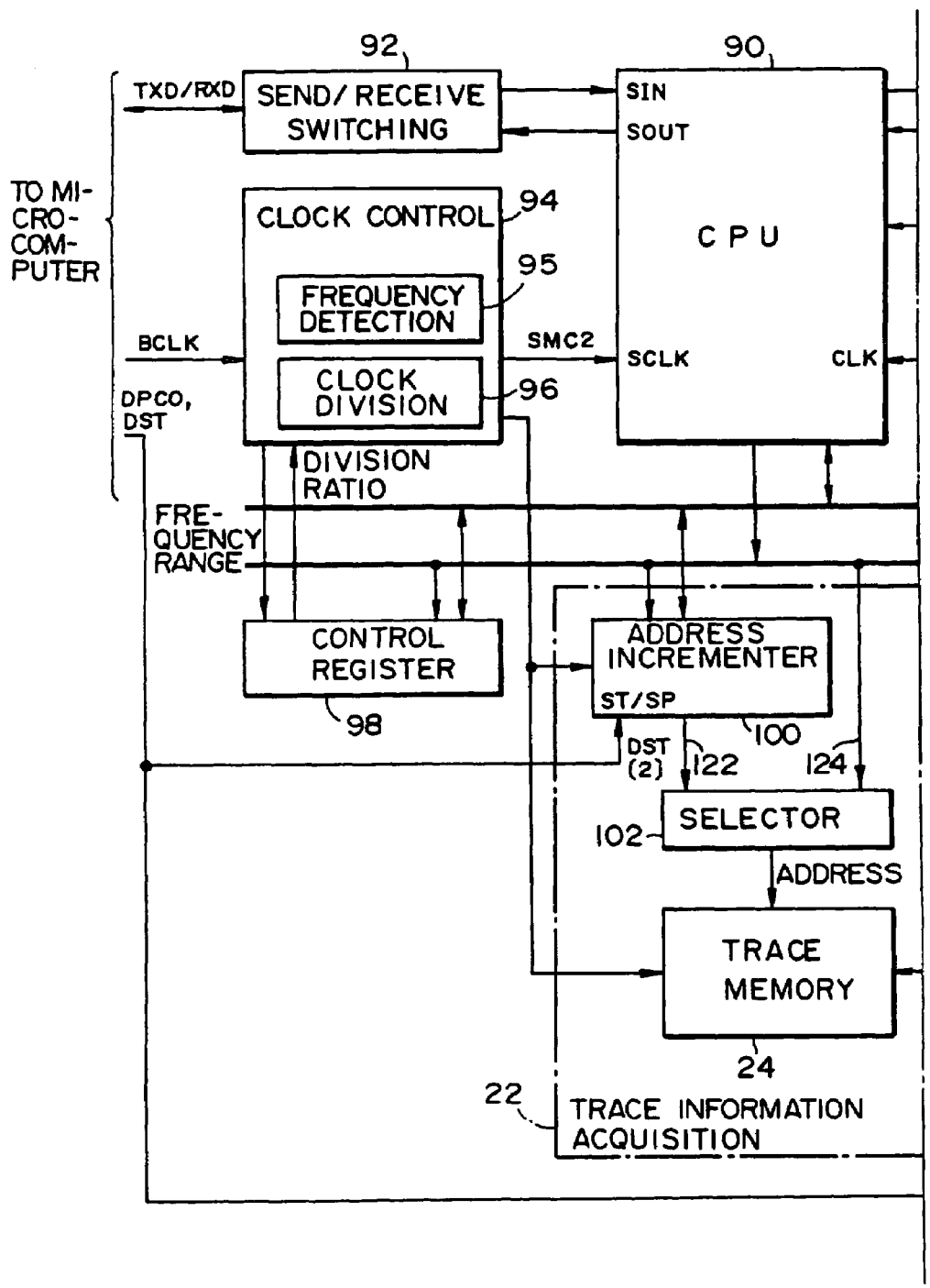
FIG. 10 is a functional block diagram of an example of the configuration of the debugging tool.

A example of the configuration of the debugging tool 20 is shown in FIG. 10.

A CPU 90 executes a program stored in a ROM 108 and provides overall control over the debugging tool 20. A send/receive switching section 92 switches between data transmission and data reception. A clock control section 94 controls a clock signal that is supplied to the SCLK terminal of the CPU 90, an address incrementer 100, and the trace memory 24. The BCLK from the microcomputer 10 (the SIO 48) is input to this clock control section 94. The clock control section 94 comprises a frequency detection circuit 95 and a clock division circuit 96. The frequency detection circuit 95 detects the frequency range to which BCLK belongs, and outputs that result to a control register 98. The division ratio of the clock division circuit 96 is also controlled by the control register 98. In other words, the external monitor program executed by the CPU 90 (stored in an external monitor ROM 110) reads the frequency range of BCLK from the control register 98. The external monitor program determines the optimal division ratio for this frequency range and writes that division ratio to the control register 98. The clock division circuit 96 divides BCLK by this division ratio to generate SMC2, and outputs it to the SCLK terminal of the CPU 90.

The address incrementer 100 increments the address in the trace memory 24. A selector 102 selects either one of a line 122 (an address output from the address incrementer 100) or a line 124 (an address from an address bus 120), and outputs that data to an address terminal of the trace memory 24. The line 124 is selected when the microcomputer is in debugging mode (when the on-chip debugging program is executing); the line 122 is selected in user mode (when a user program is executing).

In addition, a selector 106 selects either one of a line 126 (DST[2:0] and DPCO that are output from the trace information output section 14 of FIG. 6) or a line 128 (a data bus 118), then outputs data to a data terminal of the trace memory 24 or takes out data from that data terminal.

The address incrementer 100, the trace memory 24, the selector 102, and the selector 106 function as the trace information acquisition section 22.

A execution-time measurement circuit 140 comprises a clock division circuit 142 and registers 143 to 145 for holding execution times, and functions as an execution-time measurement section. The clock division circuit 142 divides actual times into 10 µ, 1 µ, and 50 ns. The timings of the start and end of execution time measurement are based on information from the line 126 (DST[2:0] and DPCO that are output from the trace information output section 14 of FIG. 6) and the totals of the measured execution times are held in the registers 143 to 145. More specifically, measurement times can be added by switching operations such that the measurement of execution time starts when 1 occurs in the odd-numbered position of DST[2] and is stopped when 1 occurs in the even-numbered position.

The ROM 108 comprises the external monitor ROM 110 (equivalent to the external monitor section 61 of FIG. 6) and an external monitor program is stored in the external monitor ROM 110. This external monitor program performs processing for converting debugging commands into primitive commands. A RAM 112 acts as a work area for the CPU 90.

An RS232C interface 114 and a parallel interface 116 provide interfaces with the host system 66 of FIG. 6, and debugging commands from the host system 66 are input to the CPU 90 through these interfaces. A clock generation section 119 is designed to generate clock signals, such as the clock that causes the CPU 90 to operate.

The description now turns to a simple version of the real-time trace processing performed by this embodiment. In this embodiment, the 3-bit DST[2:0] indicating the instruction execution status of the CPU 12 of FIG. 6 and the PC value of the branch destination are stored in the trace memory 24. Reverse-assembly is done based on the data stored in the trace memory 24 and the source code of the user program, to create trace data for the program. This configuration makes it possible to implement a real-time trace function while reducing the number of lines connecting the microcomputer 10 and the debugging tool 20.

Figure 11A:
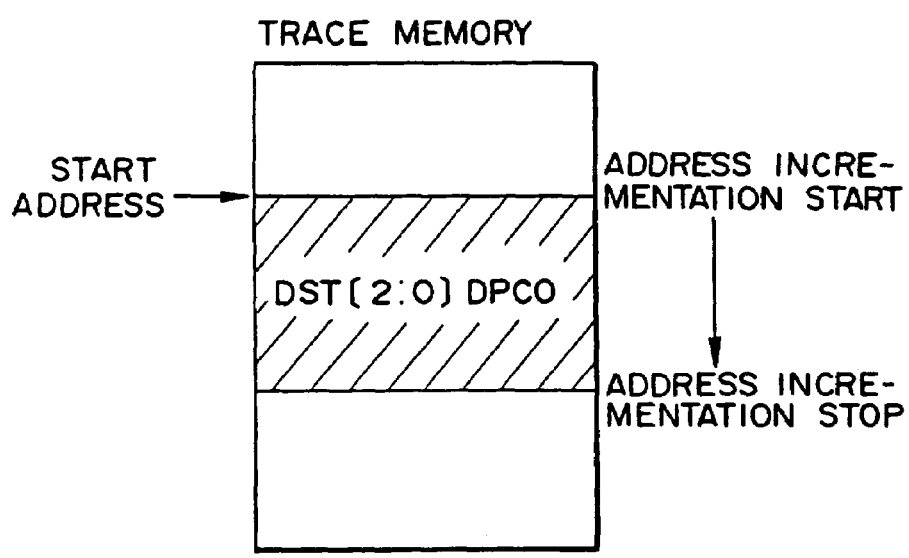
FIGS. 11A and 11B are illustrative of a real-time trace.
Figure 11B:
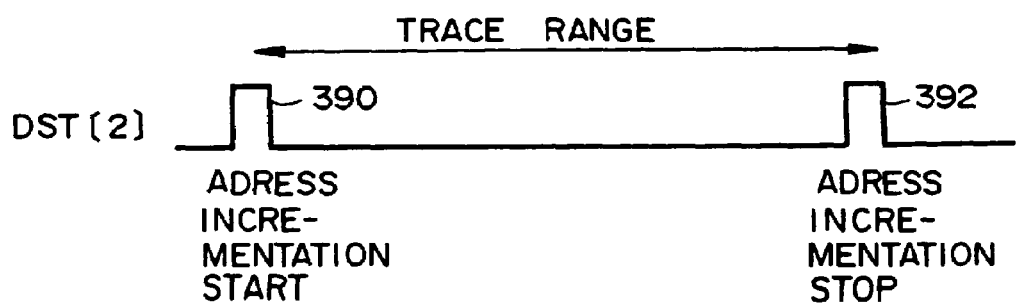

When the microcomputer is in user mode (when a user program is executing), the line 122 is selected so that the output of the address incrementer 100 is input to the address terminal of the trace memory 24 through the selector 102. In addition, when the microcomputer is in user mode, the line 126 is selected so that DST[2:0] and DPCO are input to the data terminal of the trace memory 24 through the selector 106. In this case, a start address is set initially by the CPU 90 in the address incrementer 100, using the data bus 118 and the address bus 120, as shown in FIG. 11A. A DST[2] line that specifies the trace range is also connected to a start/stop (ST/SP) terminal of the address incrementer 100. When a first pulse 390 is input to the DST[2] line, the address incrementation of the address incrementer 100 starts. When a second pulse 392 is input to the DST[2] line, the address incrementation of the address incrementer 100 stops and the trace operation halts. In this manner, data (DST[2:0] and DPCO) for the desired trace range can be stored within the trace memory 24.

When the user program execution mode shifts to debugging mode, on the other hand, the line 124 is selected so that addresses are input from the address bus 120 to the address terminal of the trace memory 24 through the selector 102. The line 128 is also selected so that data is output from the trace memory 24 to the data bus 118 through the selector 106. This makes it possible for the CPU 90 (main monitor program) to read data (DST[2:0] and DPCO) that has been stored in the trace memory 24, in debugging mode. Trace data can be created from the thus-read data and the source code of the user program.

Note that the configuration could be such that the data stored within the trace memory 24 is transmitted to the host system and the host system creates the trace.

5. Electronic Equipment

The description now turns to electronic equipment comprising the microcomputer of the present embodiment.

Figure 12A:
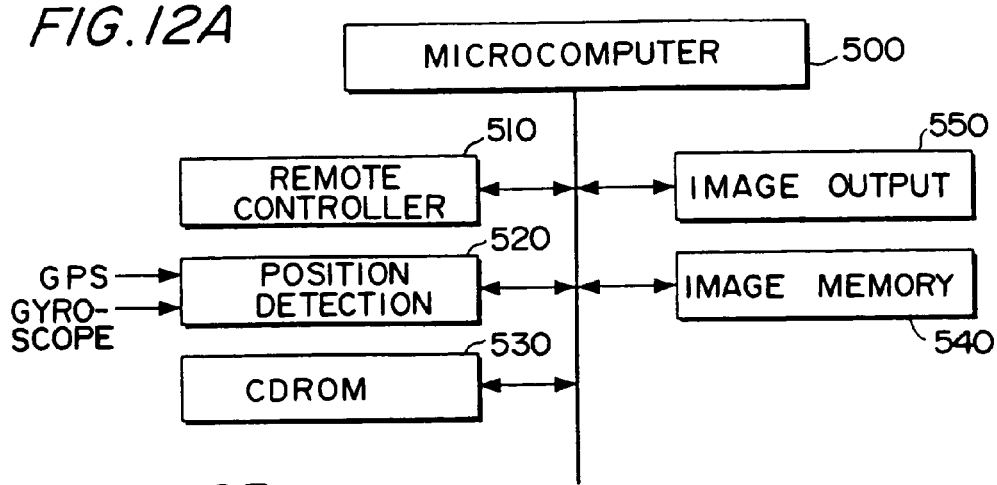
FIGS. 12A, 12B, and 12C show examples of internal block diagrams of various items of electronic equipment.
Figure 13A:
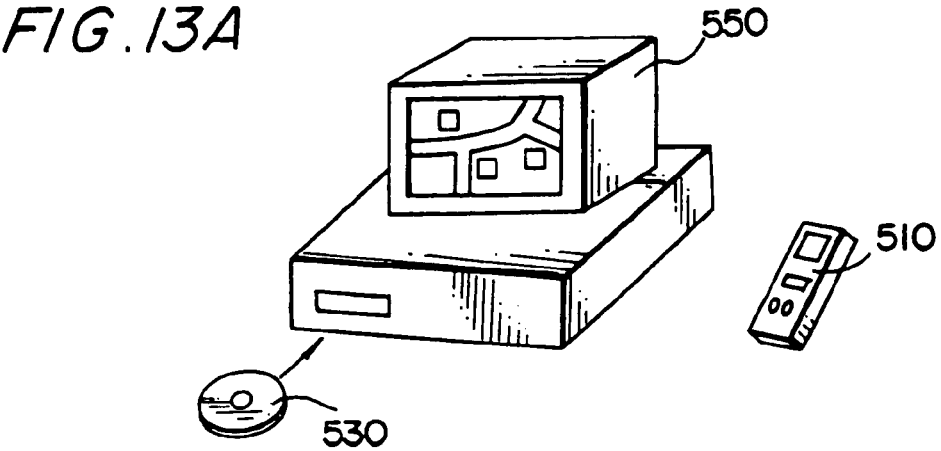
FIGS. 13A, 13B, and 13C, show external views of various items of electronic equipment.

An internal block diagram of a car navigation system that is one example of such electronic equipment is shown in FIG. 12A and an external view thereof is shown in FIG. 13A. A remote controller 510 is used to operate this car navigation system and the position of the vehicle is detected by a position detection section 520 based on information from GPS or gyroscope. Maps and other information are stored in a CD-ROM 530 (information storage medium). An image memory 540 functions as a work area during image processing, and the thus generated images are displayed to the driver by an image output section 550. A microcomputer 500 inputs data from data input sources such as the remote controller 510, the position detection section 520, and the CD-ROM 530, performs various operations thereon, then uses an output device such as the image output section 550 to output the data after the processing.

Figure 12B:
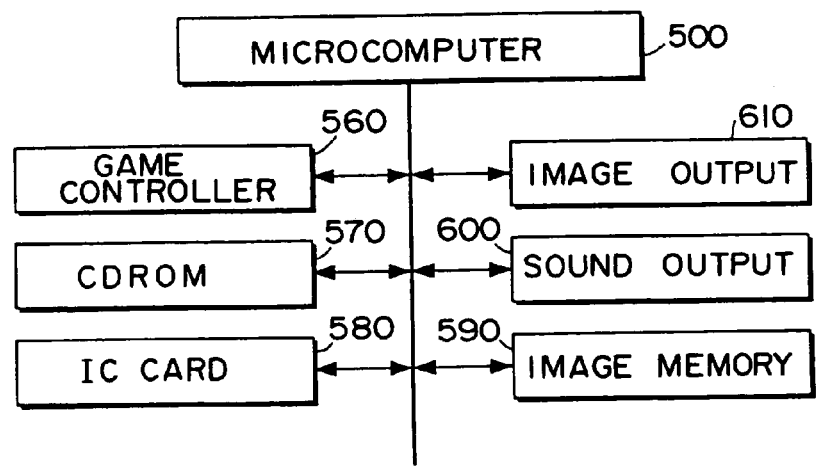
Figure 12C:
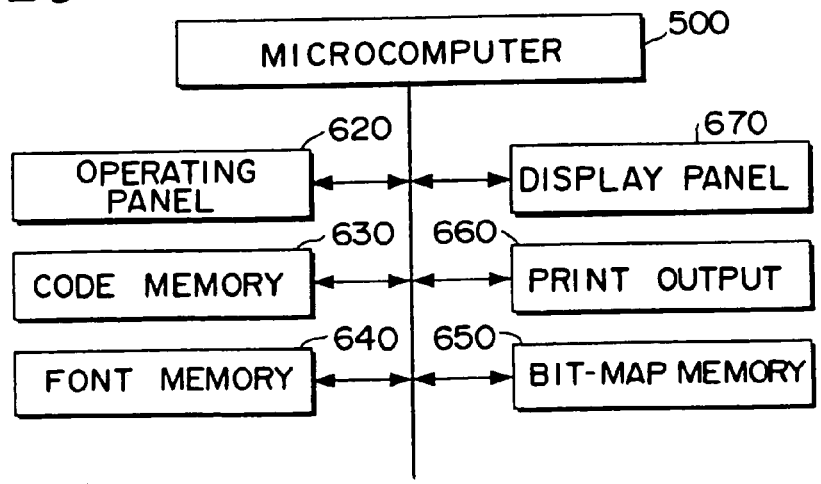
Figure 13B:
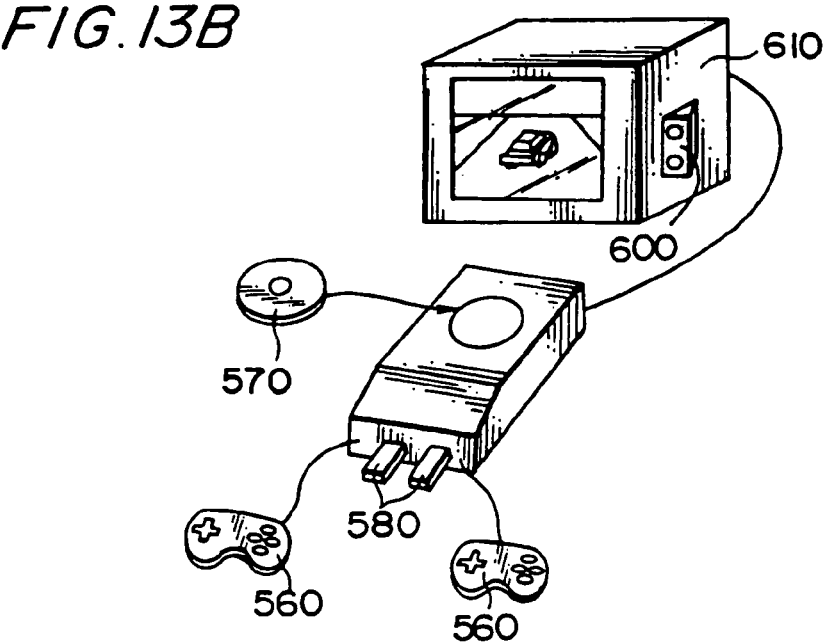

An internal block diagram of a game machine that is another example of such electronic equipment is shown in FIG. 12B and an external view thereof is shown in FIG. 13B. Using an image memory 590 as a work area, this game machine generates game images and sounds based on the player's operating information from a game controller 560, a game program from a CD-ROM 570, and player information from an IC card 580, and outputs them by using an image output section 610 and a sound output section 600.

Figure 13C:
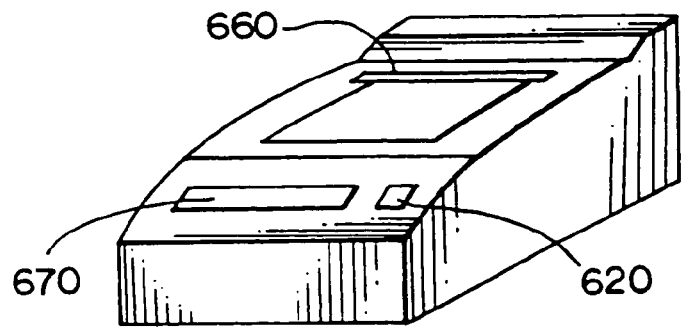

An internal block diagram of a printer that is a further example of such electronic equipment is shown in FIG. 13C and an external view thereof is shown in FIG. 13C. Using a bit map memory 650 as a work area, this printer generate print images based on operating information from an operating panel 620 and character information from a code memory 630 and font memory 640, and outputs them by using a print output section 660. A display panel 670 is used for conveying the current state and mode of the printer to the user.

The microcomputer or debugging system in accordance with the present embodiment makes it possible to simplify the development and reduce the development time of user programs that cause the operation of the items of electronic equipment shown in FIGS. 12A to 13C. Since it also makes it possible to debug user programs in an environment that is the same as that in which the microcomputer operates, the reliability of this electronic equipment can also be increased. The hardware of the microcomputer installed into this electronic equipment can be made more compact and less expensive, leading to a reduction of the cost of the electronic equipment itself. This further improves the debugging efficiency for enabling a real-time trace or execution-time measurement within a specified range, using only a small number of dedicated terminals, and also makes it possible to ensure that the user of the microcomputer makes maximum use of the terminals thereof.

Note that the electronic equipment to which the microcomputer of the present embodiment can be applied is not limited to those described in the above examples, and thus it could be any of a portable telephone (cellular phone), a PHS, a pager, audio equipment, an electronic organizer, an electronic tabletop calculator, a POS terminal, a device provided with a touch panel, a projector, a dedicated word-processor, a personal computer, a television set, or a viewfinder or direct monitor type of video tape recorder, by way of example.

Note also that the present invention is not limited to the embodiments described herein, and various modifications can be conceived within the scope of the invention.

For example, the present invention has been described as relating to a configuration that specifies a range by a single terminal, but this is merely a particularly preferred embodiment and thus the invention is not limited thereto.

In addition, this embodiment of the invention was described with reference to an example in which two breakpoints are specified, but three or more breakpoints could equally well be specified.

Furthermore, this embodiment of the invention was described as relating to the configuration of a microcomputer and a debugging tool, but various other embodiments could be conceived therefor.

The invention claimed is:

1. A microcomputer having a real-time trace function, said microcomputer comprising:
   a central processing unit that executes an instruction;
   an instruction address setting circuit that sets a start address and an end address for specifying a trace range within a program as instruction address for detecting an execution of a plurality of instructions to be executed by said central processing unit; and
   a trace information output circuit that outputs status information including mode status of said central processing unit to a plurality of output terminals,
   wherein said trace information output circuit includes a match status output circuit that outputs a match status through one of said output terminals and an omitting circuit that omits a second start address matching during a first start address match and an end address match, when the central processing unit is in a user program mode.

2. A debugging system for a target system comprising:
   the microcomputer as defined in claim 1; and
   a trace information acquisition circuit that receives said match status from said microcomputer, and acquiring trace information by controlling a start and an end of the acquisition of trace information, based on said match status.

3. A real-time tracing method to be executed by a microcomputer having a central processing unit for executing an instruction comprising:
   providing an instruction address setting circuit to set a start address and an end address for specifying a trace range within a program as instruction address for detecting an execution of a plurality of instructions to be executed by the central processing unit;
   providing a trace information output circuit to output status information including mode status of the central processing unit to a plurality of output terminals; and
   providing a match status output circuit included in the trace information output circuit to output a match status through one of the output terminals, and an omitting circuit to omit a second start address match during a first start address match and an end address match, when the central processing unit is in a user program mode.

* * * * *